United States Patent [19]

Wnek

[11] 4,294,387
[45] Oct. 13, 1981

[54] CONVERTIBLE SKI CARRYING APPARATUS

[76] Inventor: Kenneth A. Wnek, 282 Valley Park South, Bethlehem, Pa. 18018

[21] Appl. No.: 51,516

[22] Filed: Jun. 25, 1979

Related U.S. Application Data

[63] Continuation-in-part of Ser. No. 921,969, Jul. 5, 1978, Pat. No. 4,171,759.

[51] Int. Cl.³ .............................................. B60R 9/12
[52] U.S. Cl. .................................. 224/315; 224/317; 224/917; 280/814; 294/143; 294/147
[58] Field of Search ............. 280/814, 815; 224/45 S, 224/46 R, 315, 314, 317, 324–329, 917; 211/4, 60 SK; 70/58, 63; 294/142, 143, 147, 169

[56] References Cited

U.S. PATENT DOCUMENTS

| 2,988,253 | 6/1961 | Menghi | 224/917 |
|---|---|---|---|
| 3,242,704 | 3/1966 | Barreca | 280/814 |
| 3,275,160 | 9/1966 | Zurker | 280/814 |
| 3,307,759 | 3/1967 | Fulton | 224/45 S |
| 3,325,069 | 6/1967 | Fulton | 224/917 |
| 3,935,977 | 2/1976 | Bonnett | 280/814 |
| 3,990,655 | 11/1976 | Covell | 280/814 |
| 3,999,409 | 12/1976 | Bell | 280/814 |
| 4,059,209 | 11/1977 | Grisel | 280/814 |
| 4,084,735 | 4/1978 | Kappas | 224/917 |

FOREIGN PATENT DOCUMENTS 2366852 5/1978 France .............................. 280/814

Primary Examiner—Stephen Marcus
Attorney, Agent, or Firm—Ruth Moyerman

[57] ABSTRACT

An improved, convertible ski carrier in which a retainer for the skis is utilized is disclosed. The retainer includes a shelf for ski poles and is hingeably mounted to the carrier. The carrier itself is provided with a transverse opening to enable more versatility in the mounting of the carrier on a vehicle. An additional shank has been added to a locking mechanism to improve stability and anti-theft properties and an auxiliary locking mechanism including a bracket plate similar to the bracket plate intended for use with a vehicle has been added. The bracket, e.g. the assembly intended to be affixed to a vehicle, has been modified to utilize only a single vertical plate from which two bracket plates extend at right angles in opposite directions from each other.

10 Claims, 13 Drawing Figures

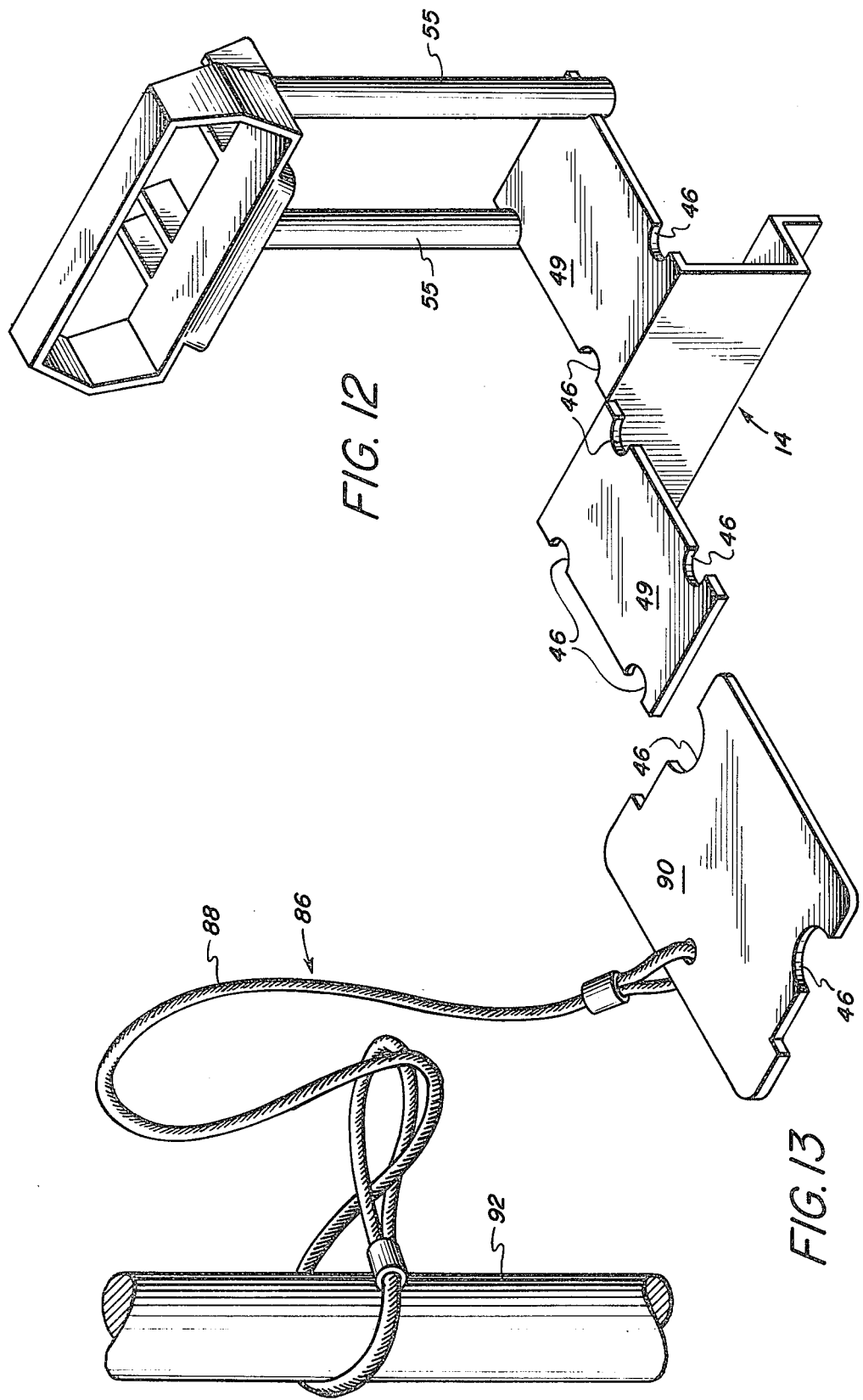

CONVERTIBLE SKI CARRYING APPARATUS

CROSS REFERENCES TO RELATED APPLICATIONS

This application is a continuation-in-part of application Ser. No. 921,969, filed July 5, 1978, now U.S. Pat. No. 4,171,759.

BACKGROUND OF THE INVENTION

1. Field of the Invention

This invention relates to package and article carriers and more particularly to ski carriers.

2. Prior Art

Skiing is increasing in popularity every day. People in everincreasing numbers are enjoying the healthful and recreational benefits of this sport. In as much as the number of areas of the country with ski slopes is confined to a very small section, there is an increasing need for better means to transport the skis and other equipment by automobile to the base of the slopes and from there to the ski areas. Carriers for attaching and holding skis on the exteriors of cars are well known and extensively in use.

It is also a well recognized fact that skis and ski equipment are extremely expensive and there is a need to handle this equipment with some care to prevent its damage. A third consideration relates to preventing theft of this valuable and expensive equipment.

The biggest disadvantage with conventional car carriers for skis is their lack of adequate anti-theft provisions, the clumsiness of using them and their lack of true versatility.

Skis are also extremely bulky and carrying them, especially in winter when people are bundled up and have gloves, can lead to awkwardness in handling the equipment. Thus, to unload the skis from the car and then transport them to the slopes may result in their being damaged.

There is, therefore, a need for a ski carrier which will combine convenience and ease of use. Furthermore, it would be an advantage to have a ski carrier which could be removed from a car while still containing the skis and then serve as a hand carrier for use on the way by foot to the ski slopes. Such a carrier would need a locking arrangement which is both effective and simple. The carrier should avoid bulkiness, be adaptable to different ski designs and be constructed so as to be easily removed from the car brackets and also allow for easy removal and re-insertion of skis. An added benefit would be realized with a ski carrier which also included means to lock the carrier to a tree, post, etc. at the slope.

SUMMARY OF THE INVENTION

In the aforementioned application titled "Convertible Ski Carrying Apparatus", Ser. No. 921,969, I disclosed a convertible ski carrier with a novel handle and locking means. That is, in operation, a pair of skis laid on their longitudinal edge on a floor portion of a housing are supported thereon by a housing side. The housing floor contains a longitudinal opening which is adapted to accommodate a bracket plate externally mounted on an automobile or other vehicle. The bracket plate contains a notch (or aperature) and the ski carrier itself includes a novel combination of locking and handle means such that when the ski carrier is mounted on the bracket, a pushing down of the handle pushes a shank portion downward through the housing and through the bracket plate, thereby preventing removal of the carrier from the bracket plate. The locking mechanism includes a rotatable extension bar which, in the locked position, mates with a groove of the shank and thus prevents the upward movement of the shank.

In the improved portable ski carrier of this invention, the same locking mechanism is utilized. However, I have now discovered certain improvements.

For example, in place of only one shank, now two shanks are utilized to improve the non-theft properties and contribute to overall stability of the carrier while mounted on the bracket plate. This necessitates a bracket plate which, in place of one, has two notches or holes to accommodate the two shanks. The bracket, e.g. the assembly intended to be affixed to a vehicle, has been modified to utilize only a single vertical plate from which two bracket plates extend at right angles in opposite directions from each other.

Another improvement in the convertible ski carrier relates to the changing of the opening in the housing floor portion from a longitudinal to a transverse opening to allow the carrier to be mounted both forward and backward on the bracket—a great convenience to the user. However, since the shank portion of the lock is not centered in the middle of the carrier, the bracket plate notches must be doubled from two to four in number to provide for both a forward and backward mounting, the forward mounting utilizing one pair of notches and the backward mounting utilizing the other set.

Furthermore, I have discovered that the use of a retainer means to hold the skis in place improves the anti-theft properties and also facilitates the assembly of the carrier parts. The retainer means of this invention is multi-purposed in that it not only protects and secures the skis but also provides pole storage. The retainer means is overall approximately the same size and configuration of the side wall of the housing. Like the housing side, the retainer portion is rigid in construction. Unlike the housing side, it is, however, hinged at its connecting edge with the floor portion of the housing. Intermittent its length is a shelf portion on which poles rest to provide for their storage. In a preferred embodiment, the retainer means terminates at its other end in a flanged portion. The flanged portion, together with the shelf, provides a stable confinement and storage for the poles.

A second function of the flanged portion is to provide an improved closure for the ski carrier housing. The flanged portion includes a grooved or aperatured section and the carrier handle includes a flanged portion with the corresponding nib or tip. Thus, part of the locking and unlocking of the ski carrier which is accomplished by the raising and lowering of the handle means (and its shank extension) also enables the retainer to become disengaged to allow its opening so that the skis and poles may be removed or inserted.

A final discovery relates to changing the auxiliary locking portion to utilize a bracket plate also.

Therefore, the object of this invention is to provide an improved convertible ski carrier, particularly an improvement of the convertible ski carrier disclosed in my former application, Ser. No. 921,969.

These and other objects will be more readily ascertainable to one skilled in the art from a consideration of the figures and exemplary embodiments.

BRIEF DESCRIPTION OF THE DRAWINGS

FIG. 1 shows a ski brace intended to be mounted on an automobile.

FIG. 2 illustrates an isometric view of the ski carrier of this invention closed and locked with skis and poles.

FIG. 3 likewise illustrates an isometric view of the ski carrier of this invention in the closed and locked position but without poles and skis.

FIG. 4 illustrates a bracket assembly intended to be mounted on an automobile and which interconnects with the ski carrier as illustrated.

FIG. 12 is an isometric showing the bracket and a partial fragmentary view of the carrier.

FIG. 13 shows the auxiliary locking means of this invention.

DETAILED DESCRIPTION OF THE PREFERRED EMBODIMENT(S)

Figures 1, 2, 3, 4:
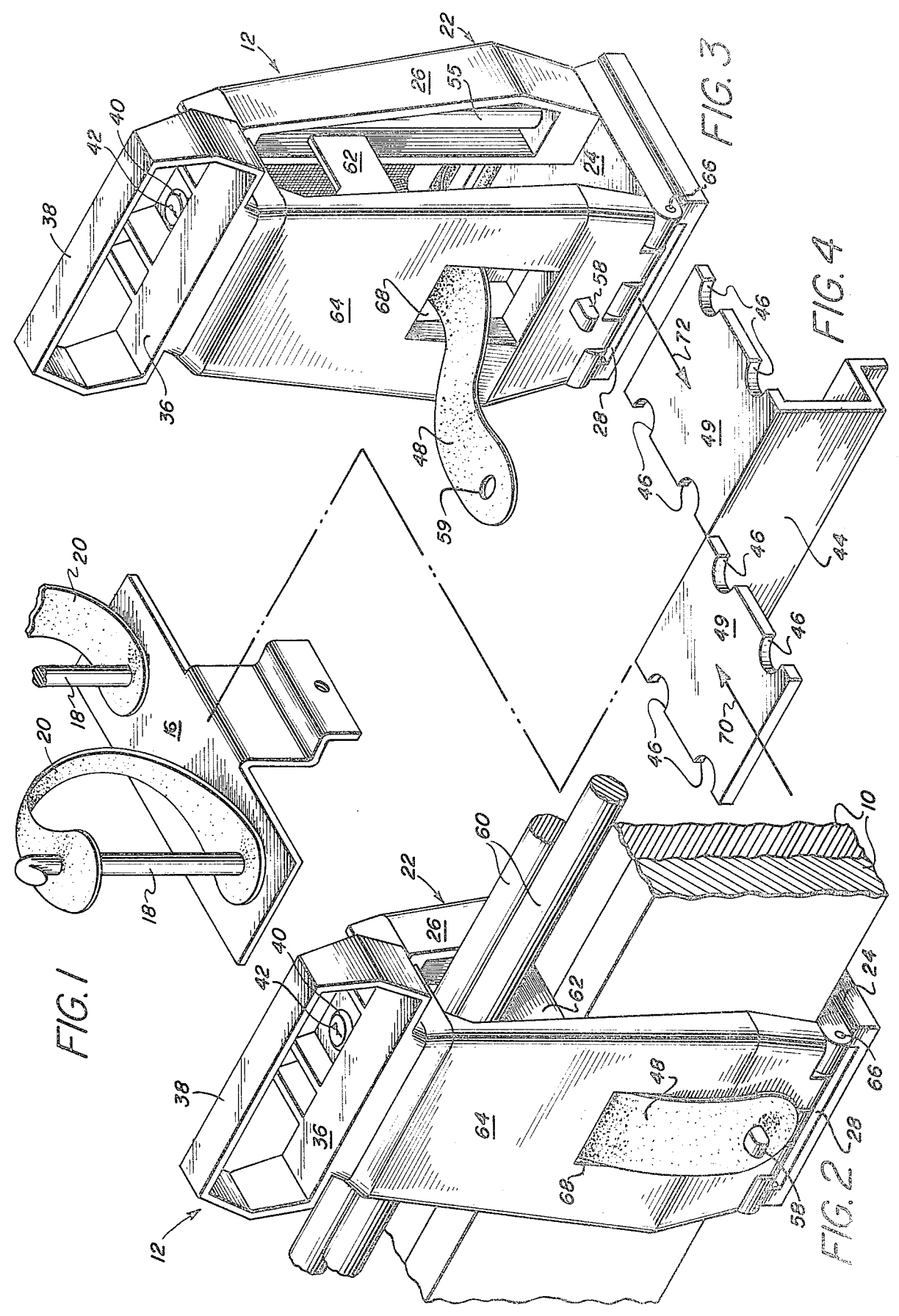
Figure 5:
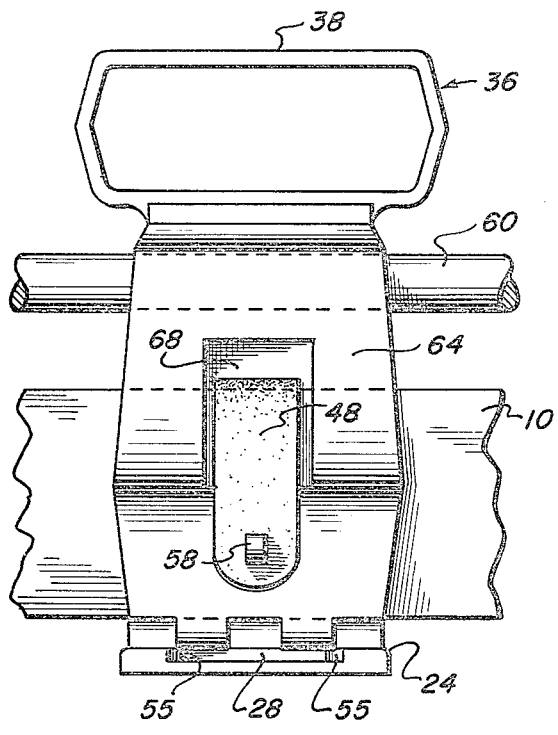
FIG. 5 is a front elevation of the ski carrier of this invention.

Referring now to the drawings and more particularly to FIG. 1, brace 16, intended to be mounted on a vehicle, is shown with pins 18 and straps 20. Straps 20 are a flexible material such as plastic or rubber and, after positioning the skis in the carrier and placing the carrier on the automobile, the ends of a pair of skis are braced by wrapping one of straps 20 around a pair of skis and snapping the strap onto the top of pins 18. Thus, brace 16 accommodates two pair of skis.

Referring now to the ski carrier itself, carrier 12 is shown in both FIGS. 2 and 3. Referring first to FIG. 2, carrier 12 is shown including skis 10 shown in fragmentary cross section and poles 60, also shown in fragmentary cross section. In FIG. 2, the skis and poles are shown in the carrier with the carrier in a closed position ready to be mounted on the bracket. Carrier 12 includes housing 22 including housing side 26 and housing floor 24. FIG. 3 shows an empty but closed carrier being mounted.

Visible in FIG. 2 and FIG. 3 is shelf 62 on which, in FIG. 2, ski poles 60 are resting. Shelf 62 extends outward from retainer 64. Retainer 64 is hingeably connected to housing floor 24 by hinge pin(s) 66. The means by which hinged retainer 64 connects with handle 36 of the ski carrier will be explained in reference to subsequent Figures. Handle 36 includes hand gripping bar 38. Also visible in FIGS. 2 and 3 is strap 48. After the skis are in position in the carrier, strap 48 is pulled over them, passed under pole shelf 62 and attached to hinged retainer 64 by pulling the strap through opening 68 in the retainer. Shank 55, to be explained subsequently in connection with the locking mechanism, is visible in FIG. 3. The strap overfits knob 58 by strap holes 59. Also visible in FIGS. 2 and 3 is lock 40 including keyhole 42. FIGS. 2 and 3 also show opening 28 in housing floor 24. Opening 28 is a transverse opening or slot which passes through the entire housing floor.

Referring now to FIG. 4, bracket 14 is shown including two bracket plates, each 49, attached to a vertically extending plate of an automobile attachment section 44. Each of plates 49 includes four notch openings 46.

In FIGS. 2, 3 and 4, the advantages of having opening 28 as a transverse opening instead of a lateral opening as it was formerly in Ser. No. 921,969 may be seen. By reference to directional arrows 70 and 72, it may be seen that, as before, two carriers may be mounted simultaneously on bracket 14. But, it is to be noted that the carrier shown in FIG. 2 is being mounted backward (in the direction indicated by arrow 70) and that the carrier shown in FIG. 3 is being mounted forward on bracket plate 49 as shown by arrow 72. Thus, either one of the carriers can be mounted both as shown or in the direction opposite the direction shown. That is, the user of the ski carriers may mount either carrier forward or backward on the bracket.

Referring now to FIG. 5, a front elevation of the convertible ski carrier of this invention is shown. Carrier 12 is shown including skis 10 and poles 60. The carrier is shown in the closed position with retainer 64 shut confining the skis and poles. In this view, strap 48 is shown secured by being pulled over knob 58. The hinging segment of retainer 64 is more clearly visible in this drawing. Likewise, transverse opening 28 is also clearly visible.

Figure 6:
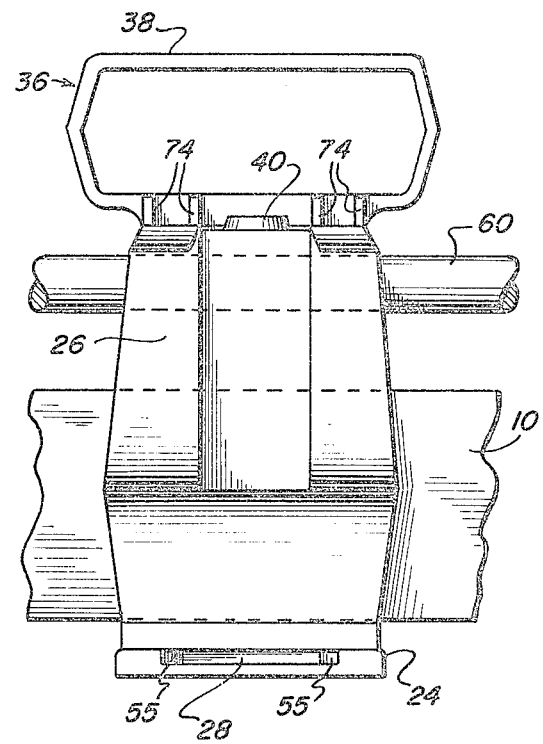
FIG. 6 is a rear elevation of the ski carrier of this invention.

In FIG. 6, a back elevation of carrier 12 is shown, again including skis 10 and poles 60 shown as fragmentary. In FIG. 6, shank connectors 74 which are projections of the shank are shown attached to handle 36. Again, transverse opening 28 is visible as part of housing floor 24. Lock 40 is also visible in this view.

Figure 7:
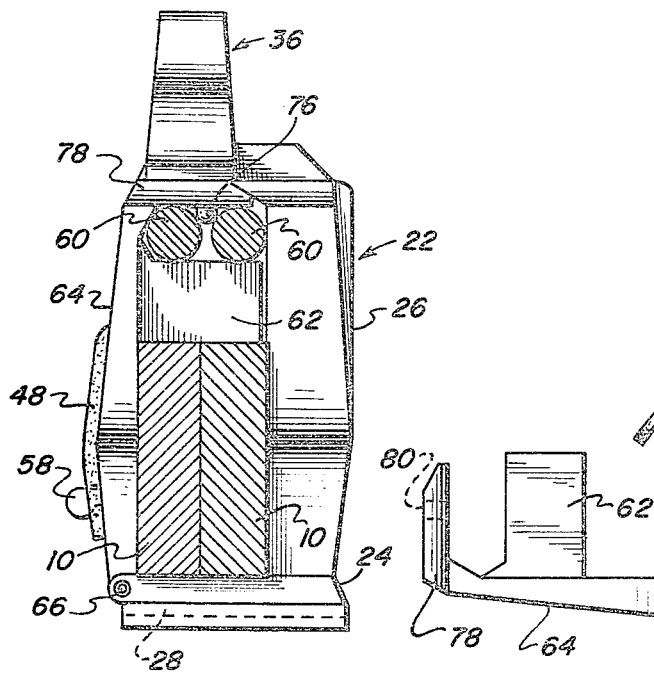
FIG. 7 is a side elevation of the ski carrier of this invention in the closed and locked mode.

Referring now to FIG. 7, a side elevation of the ski carrier of this invention is illustrated again showing handle 36, housing side 26, housing floor 24 and retainer 64. In this view, hinge pin 66 connecting retainer 64 to floor 24 is more clearly visible. In FIG. 7 it may be seen that retainer 64, at its upper end, terminates in flange 78. Flange 78 fits snuggly under handle 36. Handle 36 includes detent 76, also visible in FIG. 7, and shown resting between poles 60.

Figure 8:
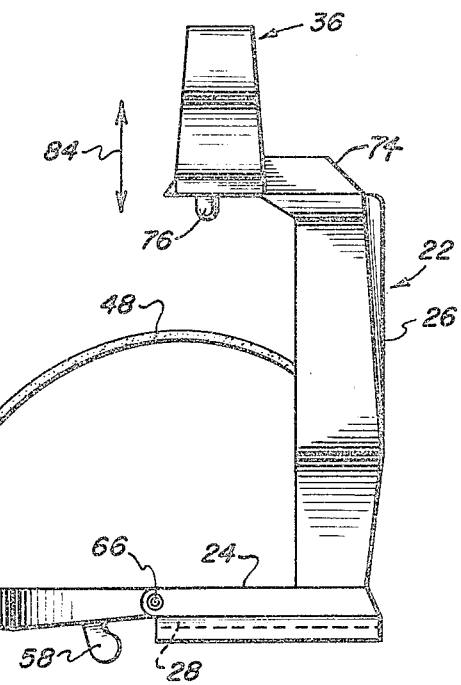
FIG. 8 is a side elevation of the ski carrier of this invention showing the retainer means opened.

With reference now to FIG. 8, the relationship between detent 76 and flange 78 may be better understood. FIG. 8 shows the ski carrier of this invention in side elevation with retainer 64 resting open. Flange 78 includes aperature 80, shown in phantom. In the closed position, detent 76 fits into and through aperature 80. The means by which detent 76 may be inserted in aperature 80 is indicated in FIG. 8 by directional arrow 84. That is, handle 36 may be readily moved in the direction indicated by directional arrow 84 when the carrier is unlocked. Thus, in order for the user to convert carrier 12 from the view shown in FIG. 7 to the view shown in FIG. 8, carrier 12 must first be unlocked. Once unlocked, handle 36 may be pulled upward as shown by directional arrow 84, disengaging detent 76 from aperature 80. By unhooking strap 48 from knob 58, retainer 64 may be opened and the skis and poles removed.

Figure 9:
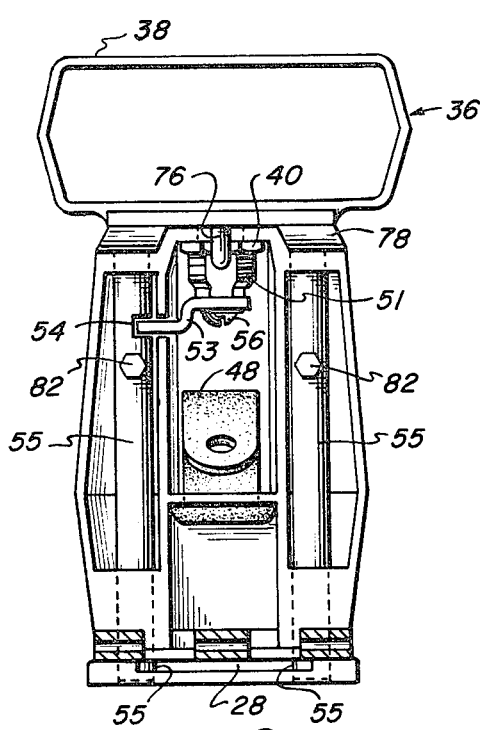
FIG. 9 is a vertical cross section of the carrier from the front showing the carrier in a closed, locked position.

Referring now to FIG. 9, a cross section is shown taken vertically through a closed and locked ski carrier, shown in FIG. 9 without poles or skis. Handle 36 is shown in the downward position with detent 76 engaging flange 78 of retainer 64. More importantly in this view, lock 40 is visible including lock casing 51. Extension bar 53 is shown as an integral part of lock 40 attached by lock nut 56. Since the view shown in FIG. 9 is a locked view, extension lock bar 53 is shown engaged in groove 54 of shank 55. The locking mechanism is thus the same as that of my previous invention except that I have now been able to eliminate a shaft which previously connected extension bar 53 to the locking mechanism. In FIG. 9 it may be seen that, while there are two shanks 55, only one of the shanks is integral with the locking mechanism. The second, nonlocking shank has been added to provide stability to the locked ski carrier. To prevent the total disengagement of shanks 55 from the ski carrier, hex bolts 82 have been added to provide a stop for the shanks.

Figure 10:
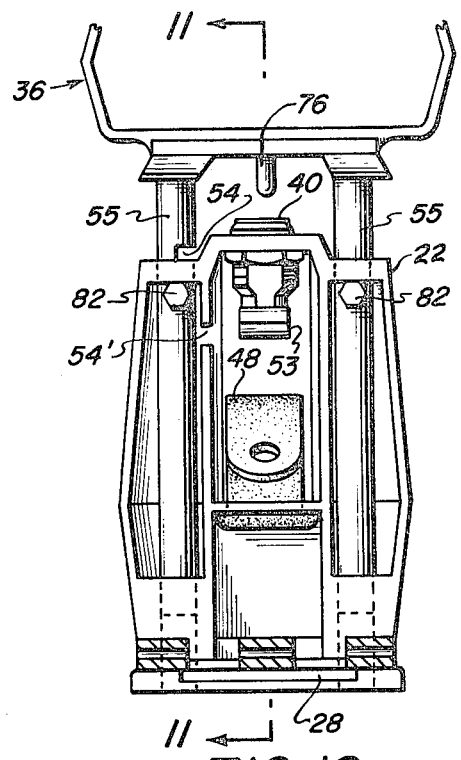
FIG. 10 is a same cross section as that of FIG. 9 only showing the carrier in an unlocked position.

With reference now to FIG. 10, the same cross section is shown but with the carrier in the open position. Thus it may be seen that handle 36 is extended upward from its position shown in FIG. 9. The upward extending of handle 36 is accomplished in that the unlocking, through a key operation, of lock 40 serves to rotate extension lock bar 53 to the right and out of groove 54. The removal of extension bar 53 liberates shank 55 and enables it to be drawn upward as shown in FIG. 10 until stops 82 engage housing 22. An additional groove, 54', is more visible in FIG. 10 than in FIG. 9 but it is with reference to FIG. 9 that groove 54' is explained. It may be seen that this extra groove is necessary to allow passage of extension bar 53 through part of the housing into shank 55.

Figure 11:
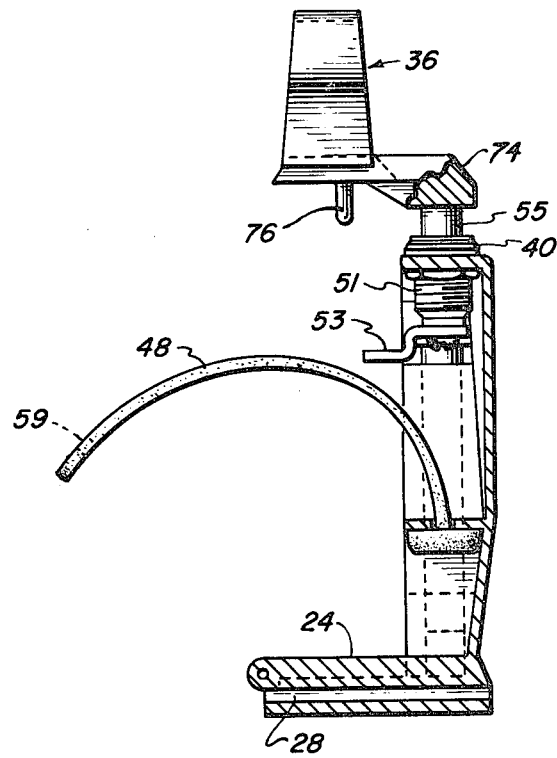
FIG. 11 is a cross section taken on lines 11—11 of FIG. 10.

With reference now to FIG. 11, FIG. 11 shows a cross section taken through lines 11—11 of FIG. 10. In FIG. 11, a better view is shown of lock extension bar 53 in the open or unlocked position. It may be seen in FIG. 11 that extension bar 53, in this position, projects outwardly from the housing. FIG. 11 also shows shank 55 in phantom so that its position and relationship in regard to passing through housing floor 24 and through a bracket plate may be understood. Furthermore, in FIG. 11, the relationship between shank 55 and handle 36 which includes the shank connector(s) 74 visible in FIG. 6 is shown. Handle 36 is connected to shank 55 in a kind of zigzag construction. The interconnection of handle 36 and shank 55 is integral in that it may be seen that a pushing up or down of the handle causes shank 55 to move in a corresponding direction.

Referring now to FIG. 12, bracket 14 is shown together with a fragmentary view of carrier 12. FIG. 12 is intended to illustrate the relationship between shank 55 and notch openings 46 in bracket plate 49. The carrier shown in FIG. 12 corresponds to the carrier shown in FIG. 3. That is when the carrier of FIG. 3 is mounted, the fragmentary view in FIG. 12 is intended to show that opposing notches at the leading edge of bracket 14 are utilized by shanks 55. The second set of opposing notches 46 are not needed for this mounting of the carrier. However, were the carrier mounted backward as the carrier shown in FIG. 2, the rearward and unused notches, or openings, would instead be employed.

Referring now to FIG. 13, auxiliary locking means 86 is shown. Auxiliary locking means is a locking cable assembly including cable 88 and bracket plate 90. Auxiliary locking means 86 is shown in use as, for example, around a tree 92. When the user is at the slopes, he may desire to lock the empty carrier so that it will not be stolen. To do so, cable 88 is slipped around a fixed object and its loop end passed over bracket plate 90. Bracket plate 90 also includes opening 46 which functions in the same manner as openings 46 of bracket plate 49 and may be inserted into carrier 12 after which the carrier may be locked through bracket plate 90.

Having now illustrated my invention, it may be seen that the ski carrier of this invention contains an improvement over prior art ski carriers including, in particular, the invention disclosed in my co-pending application Ser. No. 921,969. The longitudinal opening through which the bracket plate may be inserted has been changed from longitudinal to a transverse opening, thereby permitting more versatility in the mounting of the ski carrier. Secondly, a retainer means has been added with contributes to the anti-theft properties and, at the same time, permits the containment and confinement of ski poles. The retainer means ends in a flanged portion which may be interconnected with the locking provision of the handle means so that the ski carrier itself, including the retainer, may be locked and unlocked all in one operation. The vehicle bracket includes two bracket plates extending at right angles to a single lateral plate. The bracket plate itself has now been changed to increase the openings to facilitate forward and backward mounting of the ski carrier. Similarly, the auxiliary locking means, that is the cable part intended to lock the empty ski carrier at the slope, has been changed to include a bracket plate similar to the bracket plate attached to the vehicle.

Thus, the convertible ski carrier of this invention is an improvement such that it is more efficient, easier to assemble and more versatile in use than prior art devices.

Having now illustrated and described the device of this invention, it is not meant for such description to limit the invention but rather that the invention be limited only by the reasonable interpretation of the apended claims.

What is claimed is:

1. A convertible carrier for skis comprising:
   (a) a generally L-shaped housing including a floor portion and a side portion, said floor portion having sufficient length and width to receive at least one pair of skis resting in parallel juxtaposition, and where said skis are supported on their longitudinal edge by said floor portion, said side portion being of sufficient height to provide lateral support for said skis, said floor portion also including a transverse opening, said opening being of a shape and size to permit the insertion therein of a bracket plate which is separate from said housing;
   (b) retainer means for said skis of the same proximate size and shape as said side portion, hingeably connected at its proximal end to said floor portion and at its distal end adapted to interface with a handle means whereby said carrier may be opened or closed;
   (c) handle means to provide hand carrying of said carrier said handle means adapted to mate with said retainer means so that said handle means together with said floor portion, side portion and retainer means define a total closure for said skis and said poles, said handle means also including at least one shank portion containing at least one recess positioned intermittent its length to receive an extension bar section of a locking mechanism;
   (d) bracket means, including at least one bracket plate, adapted to be affixed to a vehicle, said bracket plate adapted to slidably mate within said housing transverse opening, said bracket plate including at least one opening to receive and permit passage therethrough of said shank whereby when an end of a shank extends into an opening, sliding of said carrier from said bracket plate is prevented; and, (e) locking means interconnected with said handle means and said shank so that when said shank is slidably mounted in said housing, said extension bar section operably connects with said locking mechanism so that unlocking of said locking mechanism operates to release said extension bar section from a recess of said shank.

2. The ski carrier according to claim 1 wherein said retainer means includes a shelf portion on which a pair of ski poles may rest positioned intermittent its length above the area occupied by skis.

3. The ski carrier according to claim 2 in which said distal end of said retainer terminates in a flange portion so that when ski poles rest on said shelf they are confined between said shelf and said flange, said flange including fastening means to releasably engage said retainer and said handle means.

4. The ski carrier according to claim 1 wherein said bracket plate includes a front edge intended to be the lead edge when said bracket plate is slidably inserted into said transverse housing opening, two side edges each including a pair of recesses, and in which opposing edge recesses are intended to operate as a unit as said openings to receive two shanks and where one set of recesses is positioned to engage shanks when said carrier is mounted forward and said other recesses engage the same shanks when said carrier is mounted backward on said plate.

5. The ski carrier according to claim 4 wherein there are two bracket plates, each being a right angled continuation of a common vertical plate, said bracket plates being affixed to said vertical plate so that their lead edges extend in opposite directions.

6. The ski carrier according to claim 1 comprising, additionally, an auxiliary locking means to attach said carrier to a fixed object, said auxiliary locking means including a length of flexible material, one end of which is attached to a bracket plate, said bracket plate including at least one opening to receive and permit passage therethrough of said handle means shank portion whereby when an end of said shank extends into an opening, sliding of said carrier from said bracket plate is prevented and wherein said other end of said flexible material is looped, said loop being large enough to pass over said bracket plate but smaller in size than said carrier.

7. The ski carrier according to claim 6 wherein said bracket plate includes a front edge intended to be the lead edge when said bracket plate is slidably inserted into said transverse housing opening, two side edges each including a pair of recesses, and in which opposing edge recesses are intended to operate as a unit as said openings to receive two shanks and where one set of recesses is positioned to engage shanks when said carrier is mounted forward and said other recesses engage the same shanks when said carrier is mounted backwards on said plate.

8. The ski carrier according to claim 1 wherein said carrier comprises, additionally, strapping means for additionally retaining said skis, one end of which is attached to said housing and the other end of which is adapted to be attached to said retainer means.

9. The ski carrier according to claim 8 wherein said retainer means has an aperature through which said strap may be drawn when said carrier is closed and means to releasably attach said strap to said retainer.

10. A convertible carrier for skis comprising:
(a) a generally L-shaped housing including a floor portion and a side portion, said floor portion having sufficient length and width to receive at least one pair of skis resting in parallel juxtaposition, and where said skis are supported on their longitudinal edge by said floor portion, said side portion being of sufficient height to provide lateral support for said skis, said floor portion also including a transverse opening, said opening being of a shape and size to permit the insertion therein of a bracket plate which is separate from said housing;
(b) retainer means for said skis hingeably connected at its proximal end to said floor portion and at its distal end terminating in a flange portion adapted to mate on closing with a flange extension of a handle means, said retainer means including a shelf portion intermittent its length on which a pair of ski poles may rest confined between said shelf and said flange;
(c) handle means to provide hand carrying of said carrier, said handle means also including a flange portion adapted to mate with said flange portion of said retainer means so that said handle means together with said floor portion, side portion and retainer means define a total closure for said skis and said poles, said handle means also including at least one shank portion containing at least one recess positioned intermittent its length to receive an extension bar section of a locking mechanism;
(d) bracket means, including said bracket plate, adapted to be affixed to an object separate from said carrier, said bracket plate adapted to slidably mate within said transverse opening, said bracket plate including at least one opening to receive and permit passage therethrough of said shank whereby when an end of a shank extends into an opening, sliding of said carrier from said bracket plate is prevented; and,
(e) locking means interconnected with said handle means and said shank so that when said shank is slidably mounted in said housing, said extension bar section operably connects with said locking mechanism so that unlocking of said locking mechanism operates to release said extension bar section from a recess of said shank.

* * * * *